3,300,437
TREATED EXPANDABLE BEADS AND
COMPOSITION THEREFOR
Thomas H. Ferrigno, Metuchen, N.J., assignor to Minerals & Chemicals Philipp Corporation, Menlo Park, N.J., a corporation of Maryland
No Drawing. Filed Jan. 28, 1964, Ser. No. 340,821
4 Claims. (Cl. 260—32.6)

This invention has to do with the production of foamed polystyrene molded plastics from normally solid thermally expandable polystyrene beads. The invention is especially directed to a novel pretreatment of such beads, prior to subjecting them to thermal expansion, so as to obviate problems normally encountered in producing foamed plastics from the polymeric beads. This invention is directed also to a clay treating agent for the beads and to treated or conditioned bead compositions.

Expandable thermoplastic polystyrene beads or pellets are made by either an emulsion polymerization technique or by extrusion. These granular particles contain a volatile solvent for the styrene polymer, usually 5% to 8% by weight of pentane or isopentane. The normally solid nonporous beads or pellets are molded and expanded by heating them to a temperature of about 212° F. As a result of the heat treatment, the blowing agent vaporizes and partially plasticizes the heat softened plastic.

In a preferred technique for making foamed polystyrene goods, the foaming and molding takes place in two distinct stages. In the first stage, the beads are pre-expanded to a density slightly less than that of the finished molding. In a typical case, the volume of the beads increases by a factor of 20.5 and the surface area by a factor of 12.5. Pre-expansion is usually carried out in an agitated steam-fed drum on a continuous basis. The beads are fed to the bottom of the drum and, as they are expanded, they rise to a top opening in the drum. From this outlet, the partially expanded beads (so-called "prepuffs") are conveyed by means of a centrifugal fan to ventilated storage bins. Here they are dried and cooled. At this stage of the process, the beads are desirably still in the form of discrete particles. In the second stage of the processing, the expansion of the beads is completed and, at such stage, the beads are fused into a coherent molded article. This is done in steam jacketed molds.

When expandable normally solid polystyrene granules are heat expanded into foamed plastic goods by the multistage process described above, a serious problem arises as a result of the fact that the prepuffs normally tend to adhere to each other and to form strongly bonded clumps or agglomerates before the molding step. Undesirable, but unavoidable partial fusion of beads to each other during the pre-expansion step accounts for the clumping of beads into these strongly bonded clumps or agglomerates. Frequently, incipient fusion between prepuffs is so extensive that the bonds between the prepuffs cannot be broken by simple shaking or by other mild agitation even after the beads have been dried.

The presence of clumped prepuffs which cannot be separated into discrete partially expanded beads by mildly shaking causes serious problems in the plant. In the first place, clumps of prepuffs cannot be conveyed properly through the processing plant since the prepuffs must be conveyed as discrete free-flowing entities. Moreover, it is essential to the provision of plastic foams of suitable physical properties to charge the molds with prepuffs in the form of discrete masses. The presence of clumps of prepuffs in the mold will result in a foamed plastic molding which undesirably varies in density from one part to another. Also, voids will invariably be present in moldings obtained with clumped prepuffs, impairing product quality. To alleviate clumping of foamable polystyrene particles it has been suggested in U.S. Patent No. 3,086,885 to Alex K. Jahn to coat the surface of expandable polystyrene beads or pellets with 0.0005% to 0.0500% by weight of a fluid siloxane polymer. The polymer is applied by spraying a dilute emulsion or solution of the polymer directly on the beads, following which the beads are carefully dried and then molded.

While not responsible for the problem of clumping, the high level of static electricity generated in the beads during initial expansion causes problems unique to this particular type of plastic manufacturing operation. Firstly, an explosion hazard is present, because the charged prepuffs contain residual volatile blowing agent. The presence of static electricity in the prepuffs also accounts for the fact that it is exeremely difficult to confine the charged, lightweight prepuffs within processing equipment. Such particles tend to float out of the processing equipment. The unconfined lightweight particles cling tenaciously to walls and even to the bodies of plant personnel.

Attempts have been made to prevent static buildup in the prepuffs by coating the beads, before expansion, with antistatic material, especially organic antistatic agents of the type used in processing other plastic goods. These attempts have been unsuccessful. When employed in quantity effective to reduce static electricity to a satisfactory extent, the presence of such agents on the bead surfaces aggravates the normal tendency of the beads to stick or clump after they undergo initial expansion.

An object of this invention is the provision of a powdered agent which when dry tumbled with expandable polystyrene particles is extremely effective in preventing agglomeration or clumping of the particles after they are pre-expanded by heat without interfering with the ability of the pre-expanded beads to bond together upon subsequent further heat expansion, which agent also effectively dissipates static electricity in the prepuffs.

Another object is to achieve the foregoing without imparting objectionable dustiness to the expandable beads.

A specific object is the provision of a novel finely divided clay product containing a hygroscopic polyfunctional amine, which product is especially useful as an agent for conditioning expandable polystyrene beads when dusted and coated on the surface of the beads.

Further objects and features of this invention will be readily apparent from a description thereof which follows.

Stated briefly, the powdered coating agent for conditioning expandable styrene beads against both clumping and static buildup consists of kaolin clay, especially a coarse size fraction of kaolin clay, the particles of which are uniformly coated with a particular type of polyfunctional amine, namely, a hygroscopic totally hydroxyalkylated alkylene polyamine, especially a totally hydroxypropylated alkylene diamine.

Still in accordance with this invention, expandable polystyrene beads are conditioned against clumping and also against buildup of static electricity after pre-expansion by dry tumbling said beads with a small amount of said polyamine coated clay. As a result, an adherent discontinuous layer of coated clay is uniformly distributed on the surface of the expandable beads, providing dust-free conditioned beads. The fact that the particular type of polyamine that is used is a viscous humectant would appear to account for the fact that the polyamine coated clay adheres well to the beads whereas the uncoated clay adheres poorly to the polymeric beads and is unsatisfactory for purposes of the invention. In other words, the polyamine acts as an adhesive, permitting the production of dust-free conditioned expandable polystyrene beads. Since the polyamine coating agent for the clay is also an effective antistatic material, the beads are conditioned against buildup of static electricity before and after pre-expansion simultaneously while being conditioned against clumping.

Since clumping is caused by fusion, and not by buildup of static electrical charge, it was surprising and unexpected that the polyamine coated kaolin clay was so effective in reducing clumping of partially expanded polystyrene beads. The results were especially surprising since when the clay or the hygroscopic polyamine is applied directly to the surface of polystyrene beads, it is not nearly so effective in reducing clumping as when the polyamine coated clay is used.

An essential feature of the conditioning agent of my invention resides in the use of kaolin clay as the solid carrier material for the totally hydroxyalkylated alkylene polyamine. This type of clay has a very low surface area and poor absorptive properties as compared with other clays. Such characteristics appear to be essential for purposes of this invention. Thus, when attapulgite clay, a high surface area, highly absorptive clay material was substituted for kaolin clay in compositions of the invention, the results were entirely unsatisfactory in spite of the fact that such clay is widely used to condition granular fertilizers against caking. Thus, when a finely divided attapulgite clay absorbent product was coated with totally hydroxypropylated ethylene diamine and polystyrene beads were dry tumbled with ½% to 1% by weight of the coated attapulgite clay, the coated clay did not stick to the hydrophobic polystyrene beads. The coated attapulgite clay was, therefore, unsuitable as a bead conditioning agent.

In carrying out this invention I prefer to use a substantially pure grade of well-crystallized kaolin clay. The term "kaolin clay" as used herein refers to a two-layer hydrous aluminosilicate mineral of the approximate empirical formula $Al_2O_3 \cdot 2SiO_2 \cdot 2H_2O$. The mineral species of kaolin clay is usually kaolinite, although clays composed of nacrite, dickite and anauxite (all of which are platy minerals characterized by the formula given above) can be used. The kaolin clay employed in carrying out this invention should be refined by removing material that is plus 325 mesh (44 microns). Whole clay or a fine or coarse size fraction of degritted kaolin clay can be used. Kaolin clay having an average particle size within the range of about 0.5 to about 5.0 microns e.s.d. is suitable. The use of a coarse size fraction of clay having an average particle size within the range of 3.0 to 5.0 microns is especially recommended. Present experience indicates that markedly improved adhesion of polyamine coated clay to unfoamed bead is realized with a coarse size fraction of clay. All micron size values mentioned herein refer to values determined by the Casagrande sedimentation method described in an article by Norton and Speil in J. Am. Ceram. Soc., 21, 89–97 (1938). Typical samples of high purity well-crystallized kaolin clay have a low surface area, usually within the range of 5 to 15 square meters per gram, as measured by the B.E.T. nitrogen absorption method described by Brunauer, Emmett and Teller, J. Am. Chem. Soc., 60, 309 (1938), using molecular size data given by Livingston, J. Am. Chem. Soc., 66, 569 (1944).

The totally hydroxypropylated alkylene polyamines used in carrying out this invention are described in U.S. 2,697,118 to Lester G. Lundsted and Walter F. Schulz. They are prepared by condensing propylene oxide with an alkylene diamine, as exemplified by ethylene diamine, propylene diamine, butylene diamine, trimethylene diamine and hexamethylene diamine. The totally hydroxypropylated alkylene diamines can be represented by the following chemical structure.

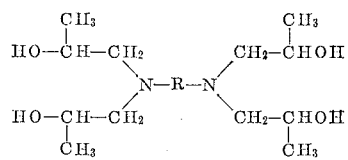

wherein: R is an alkylene radical containing from 2 to 6 carbon atoms. In carrying out this invention, the totally hydroxypropylated alkylene polyamines are used as the free base in order to obtain the required adhesion of the coated clay to the hydrophobic bead surface. Use of a salt of the totally hydroxypropylated alkylene diamine usually results in undesirably dusty clay coated beads.

The totally hydroxypropylated alkylene polyamine is employed in amount within the range of 3% to 10% of the clay weight, dry clay weight basis. When appreciably less than 3% polyamine is present in the clay conditioning agent, the coated clay may not adhere sufficiently well to the beads; also, the desired degree of destaticization and/or prevention of clumping may not be achieved. The presence of appreciably more than 10% polyamine on the clay may aggravate clumping, not minimize clumping as desired.

Especially good results have been realized when a totally hydroxypropylated akylene diamine was used in amount of 5% to 8% of the clay weight.

The totally hydroxypropylated alkylene diamine can be coated on the finely divided particles of clay by coating procedures well known to those in the art. Since the effectiveness of the coated clay particles as a conditioning agent for expandable polystyrene beads depends on the uniformity of the distribution of the hygroscopic polyamine on the clay particles, the particular coating procedure that is used must assure the deposition of a substantially uniform coating of the polyamine on the surfaces of individual clay particles. I prefer to moisten or wet the clay with an aqueous solution of the polyamine and dry the mixture at a temperature below which the polyamine decomposes. Normally, the resulting dried product will be a pulverulent free-flowing mass. If the coating technique results in a coated clay product that is not put into the required powdered condition by mild crushing, the coated clay mass can be ground to minus 44 microns in a suitable mill, such as a high speed hammer mill.

The free moisture of the polyamine coated kaolin clay should be less than 1% of the weight of the coated clay and is preferably less than 0.5% of the weight of the coated clay. Free moisture is determined by heating a material to essentially constant weight at 225° F.

The styrene polymer granules to which this invention is applicable include particles composed of various homopolymers of styrene and interpolymers of styrene containing a preponderating weight percentage of styrene. Reference is made to U.S. Patent No. 2,861,898 to Norbert Platzer for an enumeration of styrene polymers to which this invention is applicable. As mentioned in U.S. Patent No. 2,861,898, the styrene can be replaced in whole or in part by its closely related homologs (e.g., alphamethylstyrene, o-, m-, and p-methylstyrene, o-, m-, and p-ethylstyrene and 2,4-dimethylstyrene). The term "styrene polymer" as used in the specification and in the claims is intended to encompass the various homopolymers and interpolymers (including copolymers) of styrene that are enumerated in U.S. Patent No. 2,861,898. The granules are usually available in the form of beads within the range of 10 to 30 mesh.

The styrene polymer particles employed in carrying out this invention have incorporated therein as a foaming agent an organic solvent which boils at a temperature below which the polymer softens. Preferred foaming agents are aliphatic hydrocarbons or hydrocarbon mixtures which have a boiling point within the range of about 50° F. to about 175° F. As mentioned, commercially available styrene polymer beads are normally supplied with from 5% to 8% by weight of n-pentane or isopentane incorporated therein as the blowing agent. However, other volatile organic organic compounds, such as those enumerated in U.S. Patent No. 2,861,898 can be employed as the blowing agent within the scope of this invention.

To produce destaticized free-flowing foamable polystyrene beads which do not stick before or after pre-expansion, the coated kaolin clay composition is employed in amount within the range of about ¼% to about 2%, and preferably in amount within the range of ½% to 1%, based on the weight of the beads (inclusive of the weight of blowing agent contained in the beads). When employed in amount appreciably less than ½%, the clay composition may not be sufficiently effective in reducing clumping and static buildup in the beads. Quantities of coated clay apreciably in excess of about 1% may interfere with the fusion of the prepuffs and thereby impair the properties of the molding; also the clay coated beads may be dusty.

To deposit the clay composition on the expandable styrene polymer beads, the beads can be tumbled with the coated clay at ambient temperature or at a temperature below which the foaming agent has appreciable vapor pressure. Normally, a tumbling period of only a few minutes will suffice. The bead coating step can be carried out in any agitated equipment, especially tumbling equipment, such as in a horizontal drum rotating about its axis. When the beads are made by emulsion polymerization, the clay treating step can be carried out during the drying operation.

The following examples are given to illustrate the invention and its benefits.

*Example I*

In accordance with this invention, dual purpose conditioning agents for expandable polystyrene beads were obtained by coating kaolin clay with totally hydroxypropylated ethylene diamine.

The clay used in all preparations was a coarse size fraction of water-washed Georgia kaolin clay having an average particle size of 4.8 microns, e.s.d. About 98% by weight of the clay was finer than 20 microns and about 20% by weight was minus 2 microns. The oil absorption value of the clay was about 28–32 (by ASTM D281–31). In producing coated clay conditioning agents, N,N,N',N'-tetrakis (2-hydroxypropyl) ethylene diamine (Quadrol) was dissolved in sufficient water to form a solution of about 60% concentration. The solution was dripped on the clay while the clay was agitated in a Waring Blendor. The mixture of clay and polyamine solution was then dried in an oven at a temperature of 160° F., producing a powder having an unctuous texture. The free moisture content of all coated clay products was below 1%.

Samples of coated clay powder were coated on commercial expandable polystyrene beads (gasoline-resistant type) by lightly tumbling the coated clay with the beads in a rotating vessel for three minutes at room temperature of about 75° F.

The coated beads and uncoated control bead samples were then pre-expanded and molded. The equipment used to pre-expand the beads consisted of an insulated drum with a tangentially entering steam inlet at the bottom periphery. A wire screen basket was suspended in the drum for housing the beads and a loose fitting wood lid was used to form a steam chamber. The beads were pre-expanded for the time and at the steam supply pressures indicated in the table.

Immediately after pre-expansion, the beads were dumped on brown wrapping paper for drying. To determine the degree of clumping immediately after pre-expansion, a count of separated and agglomerated beads was made. The percentage of beads existing as agglomerates of two or more beads was reported as "percent agglomeration."

After fifteen minutes drying, the beads were shaken lightly on screens having sufficiently large openings to pass single beads. This was done to evaluate the extent of clumping. Qualitative differences were readily determined and were reported according to the amount of mechanical force required to break the clumps into the individual beads. A ⅜-inch glass rod rubbed 35 strokes with a new lamb's wool pad was used to determine the static charge on the dried pre-expanded beads. The volume (in ml.) of beads clinging to the charged rod was used as a measure of static potential when the rod was inserted to a fixed depth into a container of the dried pre-expanded beads and carefully withdrawn. Between test, the glass rod was washed with a highly conductive solution of an alkyl aryl sodium sulfonate detergent (Alconox), rinsed, and carefully dried.

For molding, an 8-ounce aluminum cup was drilled with uniformly spaced 1/16-inch holes and placed in a jig to hold the flat top securely in place. The flat top had a hole drilled in its center for insertion of a 3/16-inch copper pipe steam probe which had been drilled with uniformly spaced 1/16-inch holes and had a flattened sealed end. The cup was filled with dried pre-expanded beads and placed in the jig. The steam probe was carefully inserted through the hole into the beads and held firmly in place by a clamp. The steam was turned on and maintained at a pressure of 20 p.s.i.g. for 25 seconds. The probe was withdrawn immediately after the steam treatment was finished. Thirty seconds after probe removal, the entire jig was placed under a cold water faucet and was rotated while cooling for thirty seconds. The molding was then ejected from the cup by blowing compressed air through the drilled holes in the cup. The molding was then dried.

The results are summarized in table form.

EFFECT OF CONDITIONING AGENT ON EXPANSION OF FOAMABLE POLYSTYRENE BEADS

| | | | | | |
|---|---|---|---|---|---|
| Weight percent coated kaolin on beads | 0 | 0.5 | 1.0 | 0.5 | 1.0 |
| Weight percent polyamine [1] on kaolin | 0 | 5 | 5 | 8 | 8 |
| Dustiness of coated beads | | None | Slight | None | None |
| Properties after pre-expansion for 20 sec. at 10 p.s.i.g. steam: | | | | | |
| Agglomeration immediately after pre-expansion, percent | 100 | 90 | 90 | 90 | 90 |
| Ease of separation of beads after drying | Difficult | Easy | Easy | Easy | Easy |
| Relative static charge after drying, Ml in static test | 9.0 | 0.5 | 0.5 | 1.0 | 0.5 |

[1] N,N,N',N'-tetrakis (2-hydroxypropyl) ethylene diamine.

Data in the table show when the expandable polystyrene beads were conditioned with my polyamine coated kaolin clay, the normal tendency of the beads to form strongly bonded clumps after steam expansion was reduced substantially by the use of the clay conditioning agent. This result could not be realized when uncoated kaolin was substituted for the coated kaolin conditioning agent. The data show also that the coated clay was highly effective in reducing the static charge on the incompletely expanded beads.

I claim:

1. A method for preventing clumping of individual normally solid nonporous foamable styrene polymer beads one to each other when the beads are incompletely expanded by heating which comprises uniformly coating the surface of said beads before they are expanded by heat with from about ½% to 1%, based on the weight of said beads, of a dry, free-flowing powder consisting of
minus 44 micron particles of kaolin clay having an average particle size within the range of 0.5 to 5.0 microns, the surfaces of which are uniformly coated with from about 3% to 10%, based on the weight of said clay, of a totally hydroxypropylated alkylene diamine of the formula:

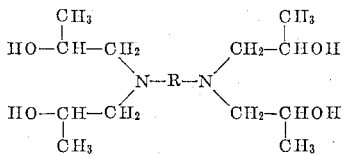

wherein: R is an alkylene radical containing from 2 to 6 carbon atoms.

2. A free-flowing composition comprising a normally solid nonporous foamable styrene polymer in the form of beads which when expanded by heating are normally susceptible to agglomeration of particles one to each other, and uniformly coated on the surface of said beads as an agent to prevent said agglomeration, from ¼% to 2%, based on the weight of said beads, of an adherent coating consisting of
minus 44 micron particles of kaolin clay having an average particle size within the range of 0.5 to 5.0 microns, the surfaces of which are uniformly coated with from about 3% to 10%, based on the weight of said clay, of a totally hydroxypropylated alkylene diamine of the formula:

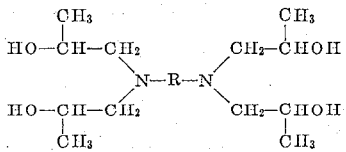

wherein: R is an alkylene radical containing from 2 to 6 carbon atoms.

3. The composition of claim 2 wherein said diamine is N,N,N',N'-tetrakis (2-hydroxypropyl) ethylene diamine.

4. The composition of claim 2 wherein said kaolin clay has an average particle size within the range of 3.0 to 5.0 microns.

References Cited by the Examiner

UNITED STATES PATENTS

| | | |
|---|---|---|
| 2,697,118 | 12/1954 | Lundsted et al. _____ 260—32.6 |
| 2,739,075 | 3/1956 | Iler. |
| 3,029,209 | 4/1962 | Ferrigno. |
| 3,056,752 | 10/1962 | Zweigle. |
| 3,172,867 | 3/1965 | Showalter. |

FOREIGN PATENTS 592,000    2/1960    Canada.

MORRIS LIEBMAN, *Primary Examiner.*

L. T. JACOBS, *Assistant Examiner.*